United States Patent
Bohmer et al.

(10) Patent No.: US 8,807,623 B2
(45) Date of Patent: Aug. 19, 2014

(54) ADJUSTABLE FOOTREST

(75) Inventors: Jeff Bohmer, Monroe, MI (US); Joseph Porcari, Canton, MI (US); Frank Ensch, Belleville, MI (US); Kenneth Chapman, Belleville, MI (US); James Deedler, Brighton, MI (US); Mike Cretul, Taylor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/567,384

(22) Filed: Aug. 6, 2012

(65) Prior Publication Data

US 2014/0035341 A1    Feb. 6, 2014

(51) Int. Cl.
*A47C 7/50*  (2006.01)

(52) U.S. Cl.
USPC .......................................... 296/75; 297/423.1

(58) Field of Classification Search
USPC ............... 296/75; 297/423.1, 423.19, 423.46; 180/331; 74/513, 512
See application file for complete search history.

(56) References Cited

U.S. PATENT DOCUMENTS

| | | | | |
|---|---|---|---|---|
| 5,183,308 | A * | 2/1993 | Koga et al. | 296/75 |
| 6,318,785 | B1 * | 11/2001 | Tousignant | 296/75 |
| 6,318,786 | B1 | 11/2001 | Sauve et al. | |
| 6,834,904 | B2 | 12/2004 | Sauvonnet et al. | |
| 6,962,094 | B2 * | 11/2005 | Porter et al. | 74/512 |
| 2003/0084744 | A1 | 5/2003 | Parenteau et al. | |

FOREIGN PATENT DOCUMENTS

DE   102009046715 A1   5/2011

* cited by examiner

*Primary Examiner* — Joseph D Pape
*Assistant Examiner* — Dana Ivey
(74) *Attorney, Agent, or Firm* — Shook Hardy & Bacon, LLP

(57) ABSTRACT

An adjustable footrest includes various components that allow positions of the footrest to be changed or customized. For example, the angle, the depth, and the rotation of the footrest may be adjusted. Some footrest components may include a pivoting base. In addition, a tilt angle of a foot-support plate may be adjusted with respect to the pivoting base.

15 Claims, 5 Drawing Sheets

ADJUSTABLE FOOTREST

FIELD OF INVENTION

Subject matter described herein is related to a footrest for a vehicle.

BACKGROUND

Often a vehicle (e.g., automobile) will include a footrest for vehicle occupants, such as occupants seated in the first row of seats. For example, a footrest might be positioned in a footwell adjacent to the driver's pedals (e.g., acceleration, brake, and clutch), such that a driver may rest his or her foot on a surface of the footrest when the foot is not being used to control one of the pedals. In addition, a footrest may be positioned in a footwell in front of a passenger's seat. Typically, footrests are stationary and are non-adjustable, such that an occupant is unable to customize various positions of the footrest.

SUMMARY

In brief and at a high level, this disclosure describes a footrest that is adjustable to include various positions (e.g., depth, incline, rotation, etc.). This high-level overview is provided here to introduce a selection of concepts that are further described below in the detailed-description section below. This summary is not intended to identify key features or essential features of the claimed subject matter, nor is it intended to be used as an aid in isolation to determine the scope of the claimed subject matter.

BRIEF DESCRIPTION OF THE SEVERAL VIEWS OF THE DRAWINGS

Illustrative embodiments of the present invention are described in detail below with reference to the attached figures, which are incorporated herein, wherein.

DETAILED DESCRIPTION

The subject matter of select embodiments of the present invention is described with specificity herein to meet statutory requirements. But the description itself is not intended to define what is regarded as an invention, which is what the claims do. The claimed subject matter might be embodied in other ways to include different elements or combinations of elements similar to the ones described in this document, in conjunction with other present or future technologies.

Figure 1:
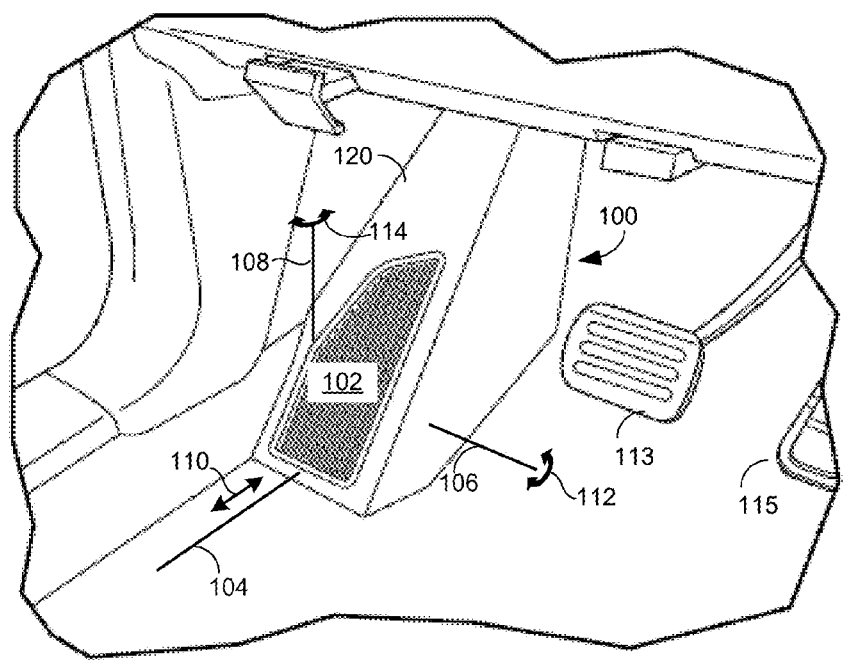
FIG. 1 depicts a footwell with a footrest in accordance with an embodiment of the present invention.

Referring to FIG. 1, an adjustable footrest 100 is depicted in a footwell near control pedals 113 and 115. FIG. 1 illustrates a footrest surface 102 on which a vehicle occupant may place his or her foot. FIG. 1 depicts multiple reference axes 104, 106, and 108 that may be used to describe adjustments that may be made to footrest 100.

For example, axis 104 and arrow 110 depict that footrest 100 may be adjusted fore-and-aft. Axis 106 and arrow 112 depict that an incline of footrest 100 may be adjusted. Axis 108 and arrow 114 depict that footrest 100 may be rotated in a manner that rotates surface 102 from a plan perspective. These are merely exemplary adjustments that may be made in accordance with an embodiment of the present invention, and footrest 100 may be moved and adjusted in fewer or more manners than those depicted in FIG. 1.

In FIG. 1, footrest 100 includes a footrest shell portion 120, which encloses a hollow space (not shown) therebeneath. That is, a combination of shell portion 120 and surface 102 enclose a space between the combination and the vehicle floor and vehicle side. Components (not shown in FIG. 1) that operate to adjust footrest 100 in the directions depicted by arrows 110, 112, and 114 may be housed within the enclosed space. These components that operate to adjust footrest 100 will be described with respect to FIGS. 2-7.

Figure 2A:
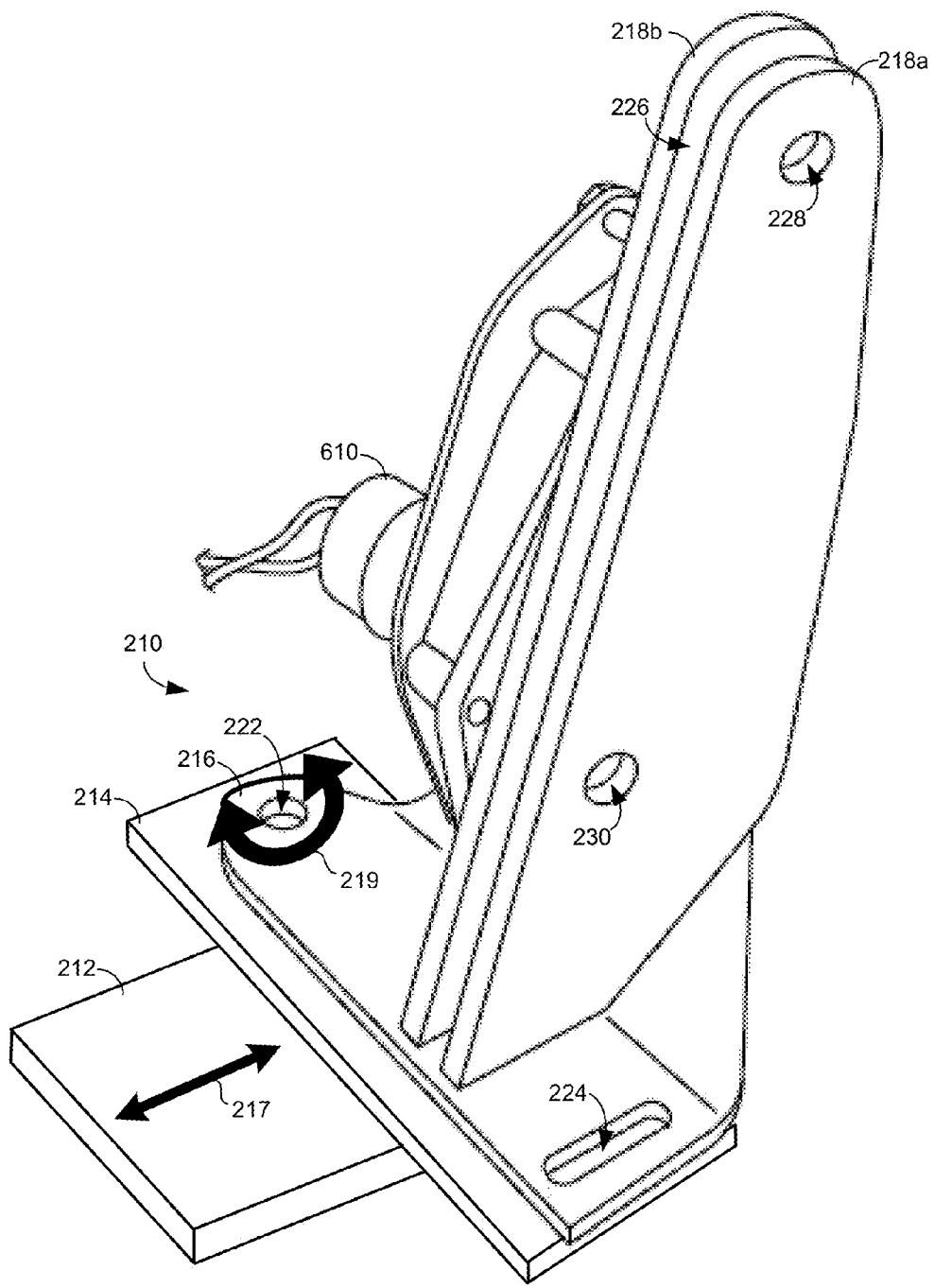
FIGS. 2A and 2B depict an elevated perspective view of a footrest base in accordance with embodiments of the present invention.

Referring now to FIG. 2A, a footrest base 210 is depicted. In an embodiment of the present invention, footrest base 210 is mounted underneath footrest surface 102, which is not shown in FIG. 2A. For example, footrest surface 102 may represent one surface of footrest plate (e.g., plate 310 in FIG. 3) that is coupled to footrest base 210. Footrest base 210 includes a fixed base 212, a sliding base 214, a pivoting base 216, and footrest-mounting plates 218a and 218b. In an embodiment of the present invention, the footrest plate 310 (e.g., in FIG. 3) attaches to base 210 by attaching between footrest-mounting plates 218a and 218b. When footrest plate 310 is coupled to footrest base 210, sliding base 214 and pivoting base 216 facilitate movement of the footrest plate 310 in the directions indicated by arrows 217 and 219.

Footrest base 210 includes a fixed base 212 that is fixedly coupled to a vehicle floor (not shown in FIG. 2A). For example, fixed base 212 may be coupled to a vehicle floor by a mechanical fastener (e.g., bolt, screw, etc.). The term "fixed" or "fixedly" is used in the context of fixed base 212 to indicate that fixed base 212 moves very little or not at all with respect to other components of footrest base 210 and footrest 100. That is, while other components of footrest 100 may move with respect to a vehicle floor (or other reference point) in order to adjust footrest 100, fixed base 212 stays in substantially the same position. In another embodiment, fixed base 212 is comprised of a vehicle floor onto which other components (e.g., 214 or 216) are connected.

Footrest base 210 also includes a sliding base 214 that is slidably coupled to fixed base 212. For example, one or more tracks (not shown) may be mounted to sliding base 214 and/or to fixed base 212 that both connect sliding base 214 to fixed base 212 and allow sliding base 214 to slide in the direction of arrow 217. Arrow 217 represents the same fore-and-aft movement as arrow 110 in FIG. 1.

Sliding base 214 may be moved by various other components or actors. In one embodiment, sliding base 214 may be manually slid fore-and-aft in the direction of arrow 217. For example, a vehicle occupant may simply push or pull on footrest 100, which in turn causes sliding base 214 to slide in the directions of arrow 217. In another embodiment, an electric motor may propel sliding base 214. For example, a motor may be mounted on or near footrest base 210, the motor providing a rotational output. In one embodiment, the rotational output is transferred by way of a threaded rod or screw to footrest base 210, thus causing sliding relative to fixed base 212. In another embodiment, a set of gears may transfer the rotational output to the sliding base 214. In a further embodiment, a belt may transfer the rotational output to the sliding base. These are merely examples, and a variety of different components may be used to slide base 214 relative to fixed base 212.

Other components (e.g., 314, 316, 318, and 320 in FIG. 3) of the adjustable footrest may also achieve a fore-and-aft adjustment and will be described in more detail in other parts of this description. In an embodiment of the present invention, sliding base 214 is used in combination with these other components to adjust the footrest fore-and-aft. In an alternative embodiment, footrest base 210 does not include sliding base 214, and these other components function to translate the footrest fore-and-aft. In embodiments in which footrest base 210 omits sliding base 214, pivoting base 216 may attach directly to fixed base 212 or to a vehicle floor.

Footrest base 210 also includes pivoting base 216 that is pivotably coupled to sliding base 214 in FIG. 2A. Pivoting base 216 includes an aperture 222 and a slot 224. In an embodiment of the present invention, pivot pins, screws, bolts, or other mechanical fasteners (not shown) may be positioned through each of aperture 222 and slot 224. Securing pivot pins in aperture 222 and slot 224 attaches pivoting base 216 to sliding base 214 (or to base 212 or to the vehicle floor) and allows pivoting base 216 to rotate or pivot in the directions indicated by arrow 219. That is, a pivot pin positioned in aperture 222 may function as a pivot on which pivoting base 216 rotates, and another pivot pin positioned in slot 224 may function as a stop that limits the rotation of base 216 when pivoting. In addition, when pivoting base 216 is attached to sliding base 214, movement of sliding base 214 fore-and-aft in the direction of arrow 217 is transferred to pivoting plate 216.

Pivoting base 216 may be rotated in the directions of arrow 219 in various manners. For example, a motor could be coupled to the footrest base 210 such that the motor output is controlled to rotate pivoting base 216. In another embodiment, pivoting base 216 is manually rotated. For example, an occupant may manually rotate base 216 by pushing or pulling on edges or portions of surface 102 or on portions of shell 120.

Base 210 also includes footrest-mounting plates 218a and 218b, that are connected to rotating base 216. As such, movements in the directions of arrows 217 and 219 are transferred to footrest-mounting plates 218a and 218b. Footrest-mounting plates 218a and 218b are spaced substantially parallel from one another to form a channel 226. FIG. 2A depicts that footrest-mounting plate 218a includes apertures 228 and 230, and footrest-mounting plate 218b includes corresponding holes. Pins or other mechanical fasteners may be positioned through the corresponding holes to attach a portion of footrest plate 310 in channel 226 and between footrest-mounting plates 218a and 218b.

Figure 2B:
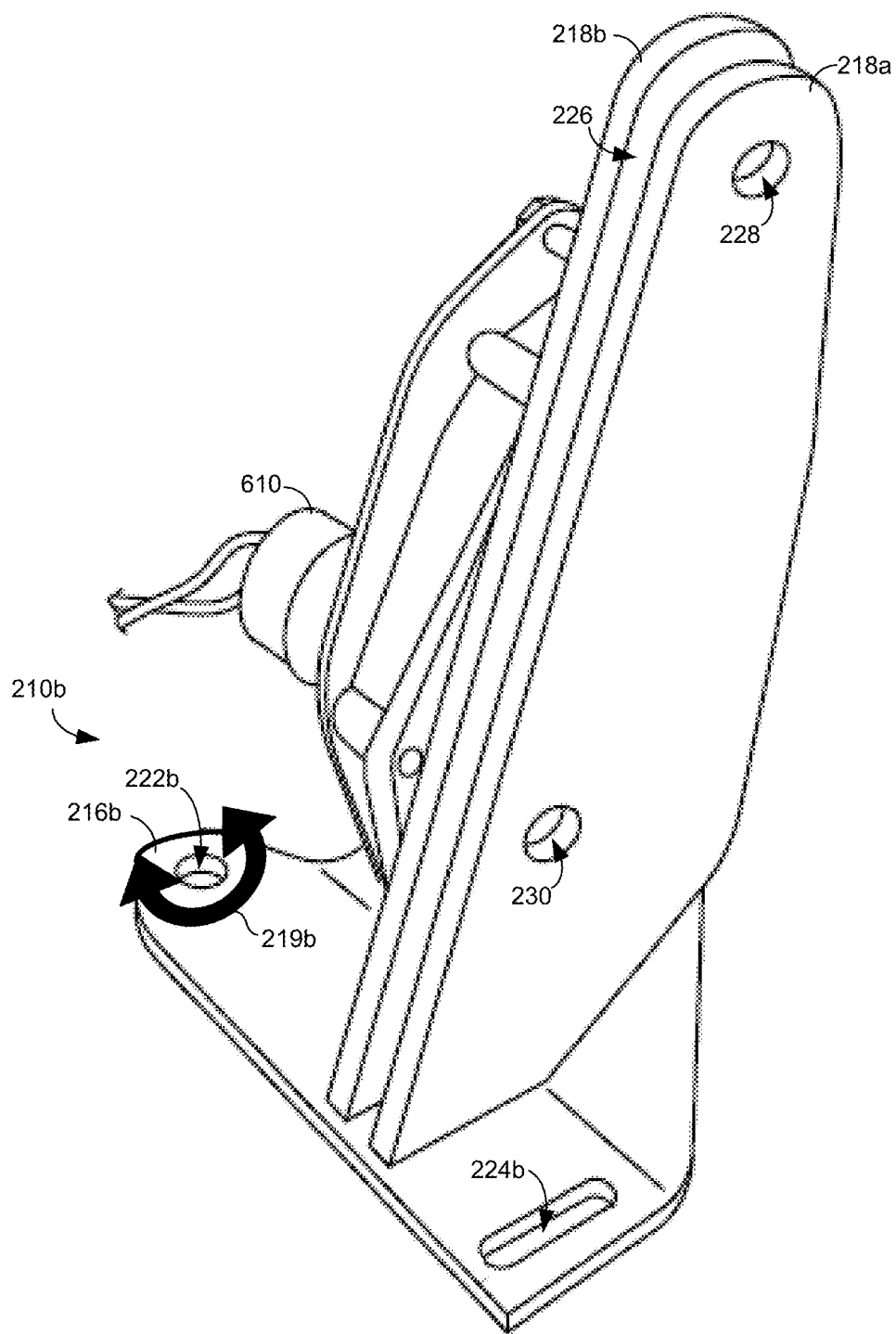

Referring now to FIG. 2B, another embodiment is depicted of a footrest base 210b. In an embodiment of the present invention, footrest base 210b is mounted underneath footrest surface 102, which is not shown in FIG. 2B. For example, footrest surface 102 may represent one surface of footrest plate (e.g., plate 310 in FIG. 3) that is coupled to footrest base 210b. Footrest base 210b includes a pivoting base 216b and footrest-mounting plates 218a and 218b. In an embodiment of the present invention, the footrest plate 310 attaches to base 210b by attaching between footrest-mounting plates 218a and 218b. When footrest plate 310 is coupled to footrest base 210b, pivoting base 216b facilitates a panning adjustment of the footrest plate 310 in the direction indicated by arrow 219b.

In an embodiment of the present invention, pivoting base 216b functions similarly to pivoting base 216 that is depicted in FIG. 2A. However, pivoting base 216b may attach to a vehicle floor (not shown) instead of onto base 214, such as by a fastener inserted through aperture 222b. As such, pivoting base 2216b may pan and be adjusted in the directions indicated by arrows 219b. In addition, a rotational movement stop may be inserted into slot 224b. The base 210b depicted in FIG. 2B does not include a sliding base, such as sliding base 214 depicted in FIG. 2A. As indicated in other portions of this description, a fore-and-aft adjustment may be achieved by other components 314, 316, 318, and 320 that are depicted in FIG. 3.

Figures 3, 4:
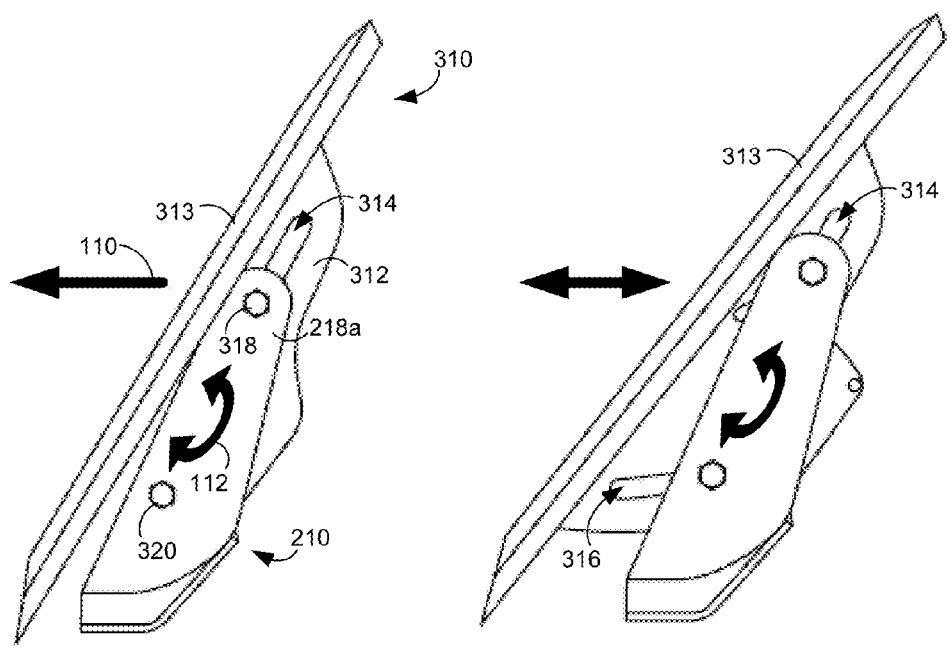
FIGS. 3-5 depict side views of a footrest in accordance with an embodiment of the present invention.

Referring now to FIG. 3, a footrest plate 310 is shown mounted onto footrest base 210. Footrest plate 310 includes a slotted mounting plate 312 fixed to the underneath side of an occupant-foot-support plate 313. The slotted mounting plate 312 fits between footrest-mounting plate 218a and footrest-mounting plate 218b (not shown in FIG. 3). Slotted mounting plate 312 includes arcuate slots 314 and 316 (shown in FIGS. 4 and 5) through which the pins or other mechanical fasteners 318 and 320 pass that are secured through the corresponding holes of footrest-mounting plates 218a and 218b.

Figure 5:
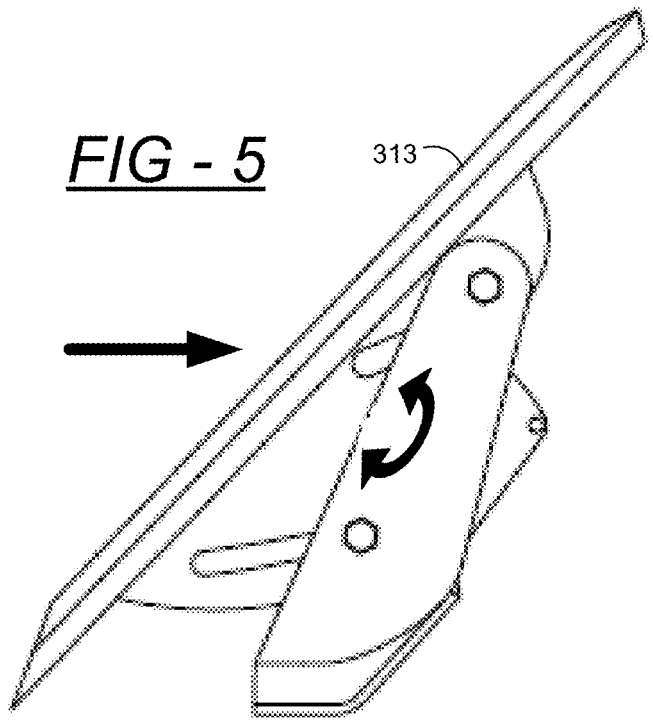

In an embodiment of the present invention, when slotted mounting plate 312 is moved within channel 226, a path of the arcuate slots 314 and 316 creates a desired angle of occupant-foot-support plate 313. As such, an angle of footrest plate 310 may be adjusted as indicated by arrow 112. In addition, when slotted mounting plate 312 is moved within channel 226, a path of the arcuate slots translates the occupant-foot-support 313 fore and aft relative to the footrest-mounting plates in the direction of arrow 110. In an embodiment of the present invention, this fore-and-aft movement operates in combination with sliding base 214 to move the footrest in the direction of arrow 217. However, in another embodiment the path of the arcuate slots is relied on to move the footrest fore and aft, such as in the illustrative example provided by FIG. 2B. For exemplary purposes, various angles and fore-and-aft positions of occupant-support plate 313 are depicted in FIGS. 3-5, which illustrate the mechanical fasters 318 at different positions within slots 314 and 316. FIG. 3 illustrates one embodiment in which the foot-support plate 313 includes a relative low incline as compared with FIGS. 4 and 5. FIG. 4 depicts a medium amount of incline of plate 313, and FIG. 5 depicts a greater amount of incline. In addition, FIG. 3 depicts a rear-most position relative to FIGS. 4 and 5, and FIG. 5 depicts a forward-most position relative to FIGS. 3 and 4.

Figure 6:
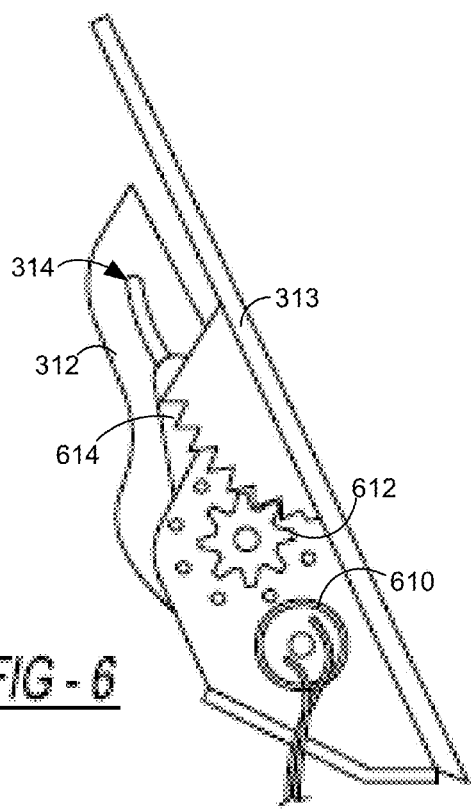
FIG. 6 depicts another side view that opposes the side views depicted in FIGS. 3-5.

Various components may be used to adjust an angle of foot-support plate 313 in the directions indicated by arrow 112. Referring to FIG. 6, exemplary components are depicted that may be used to adjust the footrest angle. FIG. 6 depicts an opposing side view as compared with FIGS. 3-5. FIG. 6 illustrates a motor 610 that is connected to footrest base. FIG. 2A also depicts motor 610 from a different perspective.

In an embodiment of the present invention, motor 610 provides a rotational output to an output-transfer component. For example, motor 610 may be coupled to a rod or a shaft that rotates in response to the rotational output of motor 610. In addition, motor 610 and/or the shaft may be connected to a belt, which transfers the rotational output provided by motor 610.

In FIG. 6, a gear 612 is connected to the output-transfer component and turns or rotates either clockwise or counter-clockwise in response to the motor's rotational output. In addition, gear 612 engages another gear, timing pins, or other toothed projection 614 on the underneath side of foot-support plate 313. Through this combination of elements, the rotation of motor 610 and gear 612 is transferred to occupant-support plate 313. As such, rotation of motor 610, gear 612, and projection 614 slides and pivots slotted mounting plate 312 on pins 314 and 316. As previously indicated, the arcuate slots 314 and 316 within the slotted mounting plate 312 enable the angle of occupant-support plate 313 to change as the slotted mounting plate 312 moves.

An embodiment of the present invention includes a footrest base assembly that attaches to a vehicle floor and that includes a pivoting base. For example, a footrest base assembly 210 may include pivoting base 216 or 216b. In addition, a footrest base 210 may include sliding base 214 and fixed base 212. An adjustable footrest may also include a footrest plate that pivotably attaches to the footrest base assembly and that includes a footrest surface. For example, a footrest plate may include footrest plate 310 that mounts to base 210. Rotating of the pivoting base pans the footrest surface relative to the vehicle floor and pivoting of the footrest plate adjusts an angle of the footrest surface. For example, rotation of base 216 pans the footrest surface in the direction of arrow 219 and pivoting footrest plate 310 adjusts an angle as indicated by arrow 112.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. An adjustable footrest for use with a motor vehicle, the adjustable footrest comprising:
   a footrest base assembly that attaches to a vehicle floor and that includes a pivoting base, wherein the pivoting base includes an aperture that receives a mechanical fastener and a slot that receives a pin;
   a footrest plate that pivotably attaches to the footrest base assembly and that includes a footrest surface;
   a motor providing a rotational output to an output-transfer element; and
   a gear attached to the output-transfer element, wherein the footrest plate includes a set of teeth that engage the gear and that transfer the rotational output to the footrest plate, wherein a rotation of the pivoting base about the mechanical fastener pans the footrest surface relative to the vehicle floor and wherein the pin traverses the slot when the pivoting base rotates about the mechanical fastener.

2. The footrest of claim 1, wherein the footrest base assembly includes a slidable base that slidably mounts to a fixed base.

3. The footrest of claim 2, wherein the fixed base is the vehicle floor.

4. The footrest of claim 2, wherein the fixed base is a fixed mounting base that mounts to the vehicle floor.

5. The footrest of claim 2, wherein sliding the slidable base moves the footrest surface fore and aft.

6. The footrest of claim 2, wherein rotating the pivoting base about the mechanical fastener pans the footrest surface on a reference axis that extends through the mechanical fastener and substantially perpendicular to the vehicle floor.

7. The footrest of claim 1, wherein the footrest plate includes a slotted plate having a track, wherein a pin passes through the track and the footrest base to pivotably attach the footrest plate to the footrest base, and wherein the pin travels through the track when the rotational output is transferred to the footrest plate.

8. An adjustable footrest for a motor vehicle, the footrest comprising:
   a base that pivotably attaches to a vehicle floor;
   footrest mounting plates that extend from the base and that are spaced apart, wherein a channel extends between the footrest mounting plates;
   a slotted mounting plate that slidably fits inside the channel and between the footrest mounting plates; and
   an occupant-foot-support plate attached to the slotted mounting plate.

9. The adjustable footrest of claim 8, wherein the slotted mounting plate includes an arcuate slot having a path, and wherein a fastener is positioned through the arcuate slot and through at least one of the footrest mounting plates.

10. The adjustable footrest of claim 9, wherein the slotted mounting plate pivots on the fastener when the slotted mounting plate slides through the channel, and wherein pivoting on the fastener adjusts the angle.

11. The adjustable footrest of claim 9, wherein the occupant-foot-support plate adjusts fore-and-aft when slotted mounting plate slides through the channel and the fastener traverses the path of the arcuate slot.

12. The adjustable footrest of claim 8 further comprising,
   a motor providing a rotational output to an output-transfer element, and
   a gear attached to the output-transfer element,
      (1) wherein the occupant-foot-support plate includes a set of teeth that engage the gear and that transfer the rotational output to the occupant-foot-support plate, and
      (2) wherein transferring the rotational output to the occupant support plate slides the slotted mounting plate through the channel.

13. An adjustable footrest for a motor vehicle, the footrest comprising:
   a base including an aperture that receives a pin for pivotable attachment of the base to a vehicle floor;
   footrest mounting plates that extend from the base and that are spaced apart such that a channel extends between the footrest mounting plates;
   a slotted mounting plate that slidably fits into the channel, the slotted mounting plate having an arcuate slot, wherein a fastener passes through the arucate slot and is attached to at least one of the footrest mounting plates; and
   an occupant-foot-support plate attached to the slotted mounting plate.

14. The footrest of claim 13, wherein the occupant-foot-support plate adjusts fore-and-aft when the slotted mounting plate slides through the channel and the fastener traverses the path of the arcuate slot.

15. The footrest of claim 13 further comprising,
   a motor providing a rotational output to an output-transfer element, and
   a gear attached to the output-transfer element,
      wherein the occupant-foot-support plate includes a set of teeth that engage the gear and that transfer the rotational output to the occupant-foot-support plate, and
      wherein transferring the rotational output to the occupant support plate slides the slotted mounting plate through the channel.

* * * * *